(12) United States Patent
Paller et al.

(10) Patent No.: US 6,894,252 B2
(45) Date of Patent: May 17, 2005

(54) DOUGH PROOFING APPARATUS AND RELATED METHODS

(75) Inventors: Hans Paller, Maple Valley, WA (US); Michael Bock, Buckley, WA (US)

(73) Assignee: Premark FEG L.L.C., Wilmington, DE (US)

( * ) Notice: Subject to any disclaimer, the term of this patent is extended or adjusted under 35 U.S.C. 154(b) by 0 days.

(21) Appl. No.: 10/411,176

(22) Filed: Apr. 10, 2003

(65) Prior Publication Data

US 2004/0200823 A1 Oct. 14, 2004

(51) Int. Cl.[7] .............................. A21B 1/24; A21B 1/26
(52) U.S. Cl. ..................... 219/400; 219/401; 99/476; 99/483
(58) Field of Search ............................ 219/400, 401; 99/474–476, 483; 126/21 A (56) References Cited

U.S. PATENT DOCUMENTS

| | | | |
|---|---|---|---|
| 3,861,378 A | | 1/1975 | Rhoads et al. |
| 4,426,923 A | * | 1/1984 | Ohata ........................ 219/400 |
| 4,587,946 A | | 5/1986 | Doyon et al. |
| 4,771,163 A | * | 9/1988 | Thiboutot ................... 219/400 |
| 4,823,766 A | | 4/1989 | Violi |
| 4,884,553 A | * | 12/1989 | Schwarzbacker ......... 126/21 A |
| 4,975,047 A | | 12/1990 | Mitsuhashi et al. |
| 5,228,385 A | | 7/1993 | Friedrich et al. |
| 5,401,940 A | * | 3/1995 | Smith et al. ................. 99/475 |
| 5,463,940 A | * | 11/1995 | Cataldo ........................ 99/476 |
| 5,601,070 A | * | 2/1997 | Hotard et al. ............. 126/21 A |
| 5,789,007 A | | 8/1998 | Bianco |
| 5,801,362 A | | 9/1998 | Pearlman et al. |
| 5,913,967 A | | 6/1999 | Eisele |
| 5,928,541 A | * | 7/1999 | Tsukamoto et al. ......... 219/400 |
| 6,350,965 B2 | * | 2/2002 | Fukushima et al. ......... 219/401 |
| 6,619,189 B1 | * | 9/2003 | Tippmann et al. ........ 126/21 A |

OTHER PUBLICATIONS

Hobart Food Equipment—HPC Series Brochure, 4 pages, Apr. 01, 2001.

* cited by examiner

Primary Examiner—Joseph Pelham
(74) Attorney, Agent, or Firm—Thompson Hine LLP (57) ABSTRACT

A dough proofing cabinet includes a chamber having a chamber panel with a plurality of openings distributed thereon. A heating element may be located to the backside of the chamber panel, or elsewhere outside of the chamber. Operation of a blower causes air flow through the chamber panel openings, past the heating element and back to the chamber along at least one air flow path. In one example both upper and lower air flow paths are provided. An intermediate panel with one or more openings may be provided adjacent the chamber panel to create an area that receives air passing through the wall openings.

36 Claims, 6 Drawing Sheets

DOUGH PROOFING APPARATUS AND RELATED METHODS

TECHNICAL FIELD

The present application relates generally to cabinets utilized for proofing dough (i.e., allowing the dough to rise), and more particularly to a dough proofing cabinet with an improved air flow system for more uniform proofing within the cabinet.

BACKGROUND

Figure 8A:
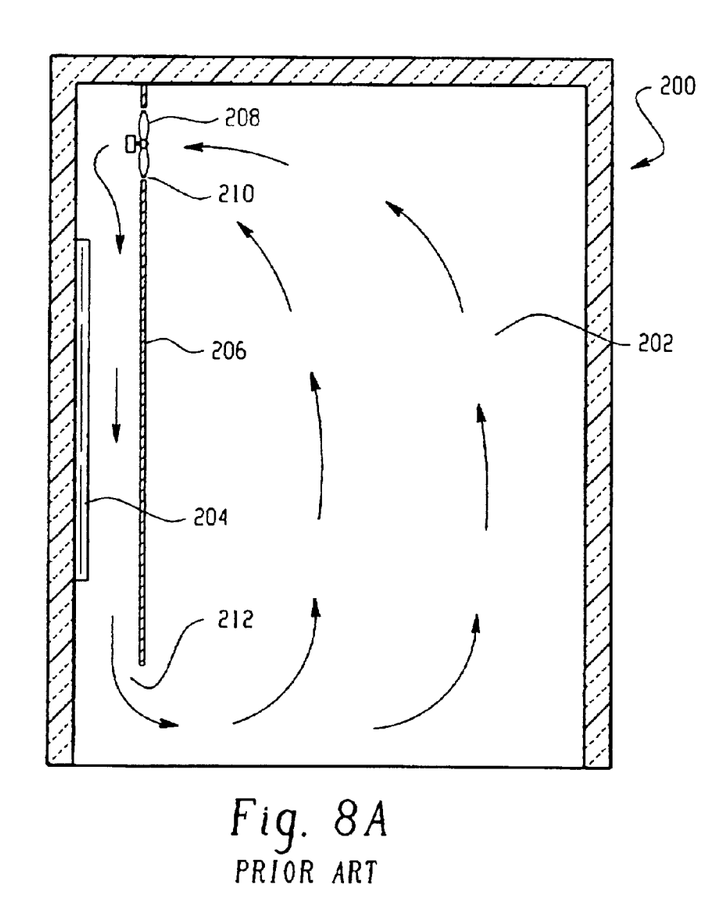
FIGS. 8A–8B is a side elevation showing the air flow of a known, prior art proofer.
Figure 8B:
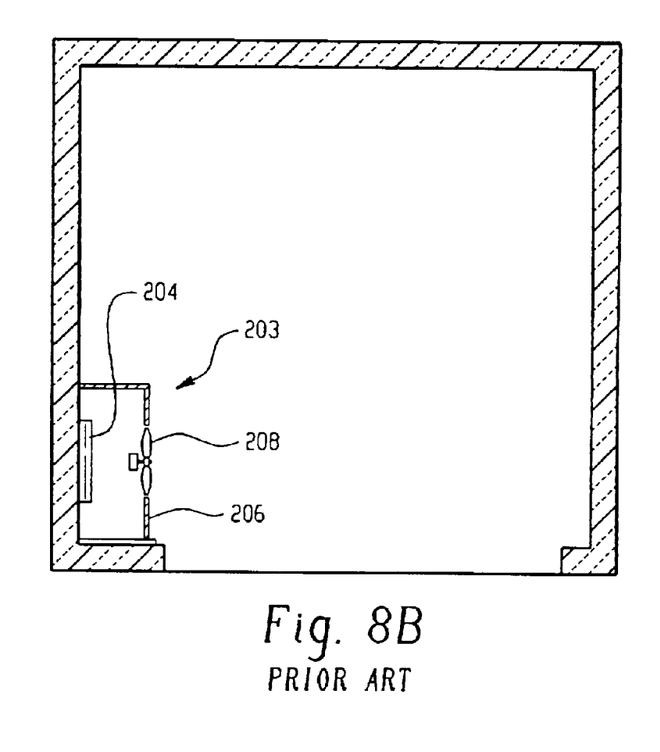

It is known to provide dough proofers in the form of cabinets having chambers for holding dough products. For example, FIGS. 8A and 8B illustrate one embodiment of a known prior art dough proofer 200 having a chamber 202 with a door to provide access and permitting a rack of dough products to be rolled into and out of the chamber 202. A rectangular heating unit 203 includes an internal heating plate 204 and associated source of water behind a wall or panel 206 of the unit 203. Toward the top of the panel 206 one or more axial fans 208 are provided in association with openings 210 of the panel 206. The fans 208 are operated to cause humid air to flow in the general manner shown, downward across the heating plate 204, past an opening or openings 212 defined by the bottom part of the panel 206, upward through the chamber 202, and then back through the panel 206 toward the top thereof to again pass move down and pass over the heating plate 204.

It would be advantageous to provide a dough proofer with an improved air flow arrangement in order to provide a more uniform air flow over the dough products during proofing, resulting in more uniform proofing.

SUMMARY

In one aspect, a dough proofing apparatus includes a chamber for holding dough during proofing operations and having a door for accessing the chamber. At least one chamber panel partially defines the chamber and has a plurality of openings distributed thereon, the openings located along at least a mid-section of a height of the chamber. A heating element is located outside the chamber and in flow communication with the plurality of openings. A source of water is provided for increasing humidity. An upper air flow path leads from the heating element back to the chamber for returning air to an upper part of the chamber and a lower air flow path leading from the heating element back to the chamber for returning air to a lower part of the chamber. At least one blower is provided for causing air to flow through the chamber panel openings, past the heating element and along both the upper air flow path and the lower air flow path back to the chamber.

In another aspect, a dough proofing apparatus includes a chamber for holding dough during proofing operations, at least one chamber panel partially defining the chamber and having a plurality of openings distributed thereon. At least one intermediate panel is located behind the chamber panel and defining an area for receiving air passing through the plurality of openings in the chamber panel, the intermediate panel having at least one opening located therein. A blower is associated with the intermediate panel opening, wherein operation of the blower causes air to flow through the intermediate panel opening out of the area between the intermediate panel and the chamber panel to create a reduced pressure condition in the area between the intermediate panel and the chamber panel causing air to flow from the chamber through the chamber panel openings. A heating element is located to have air moved by the blower pass thereby and a source of water is provided for increasing humidity. At least one air flow path leads from the heating element back to the chamber for returning air to the chamber.

In still another aspect, a method for proofing dough involves: providing a dough proofing apparatus having a chamber for holding dough, a chamber panel including a plurality of openings distributed thereon, the openings located along at least a mid-section of a height of the chamber, a heating element located outside the chamber, an upper air flow path from the heating element back to the chamber and a lower air flow path from the heating element back to the chamber; placing dough within the chamber; operating at least one blower to cause air flow from the proofer chamber, through the chamber panel openings, over the heating element and back to the chamber along both the upper air flow path and the lower air flow path; controlling a heat output by the heating element and controlling a source of water to produce a temperature condition and humidity condition within the chamber suitable for proofing dough.

In a further aspect, a method for proofing dough involves providing a dough proofing apparatus having a chamber for holding dough, a chamber panel including a plurality of openings distributed thereon, an intermediate panel adjacent a backside of the chamber panel to form an area for receiving air passing through the openings from the chamber, an intermediate panel air flow path leading from the area and including at least one associated blower, a heating element located outside the chamber, at least one return air flow path in communication with the intermediate panel air flow path and leading back to the chamber; placing dough within the chamber; operating the blower to cause air flow along the intermediate panel air flow path and to the return path to create a reduced pressure condition in the area between the intermediate panel and the chamber panel, the reduced pressure condition causing air flow from the proofer chamber, through the chamber panel openings into the area between the intermediate panel and the chamber panel; controlling a heat output by the heating element and controlling a source of water to produce a temperature condition and humidity condition within the chamber suitable for proofing dough.

In still another aspect, a modular wall unit for use in constructing dough proofers of various sizes includes an insulated wall, with a first panel mounted to the insulated wall forming a space between the insulated wall and the panel, the first panel including a plurality of openings thereon. A heating element is mounted on a side of the insulated wall within the space. An intermediate panel is mounted between the first panel and the insulated wall and separating the heating element from the first panel, at least one opening located in the intermediate panel. A blower is aligned with the intermediate panel opening.

In a further aspect, a method of manufacturing dough proofers in either of first and second configurations is provided, wherein in the second configuration a proofing chamber depth is about twice that of the first configuration, and using modular wall units each having an insulated wall part, a panel connected to the wall part, and an integrated heating element. The method involves the steps of: determining whether to manufacture the first configuration or the second configuration; if a determination is made to manufacture the first configuration, incorporating into the manufactured proofer a single one of said one of said modular wall units with its insulated wall part forming an external portion of the proofer and with its panel partially defining the proofing chamber; if a determination is made to manufacture the second configuration, incorporating into the manufactured proofer two of said modular wall units, with each insulated wall part forming a respective external portion of the proofer and with each panel partially defining the proofing chamber.

DETAILED DESCRIPTION

Figure 1:
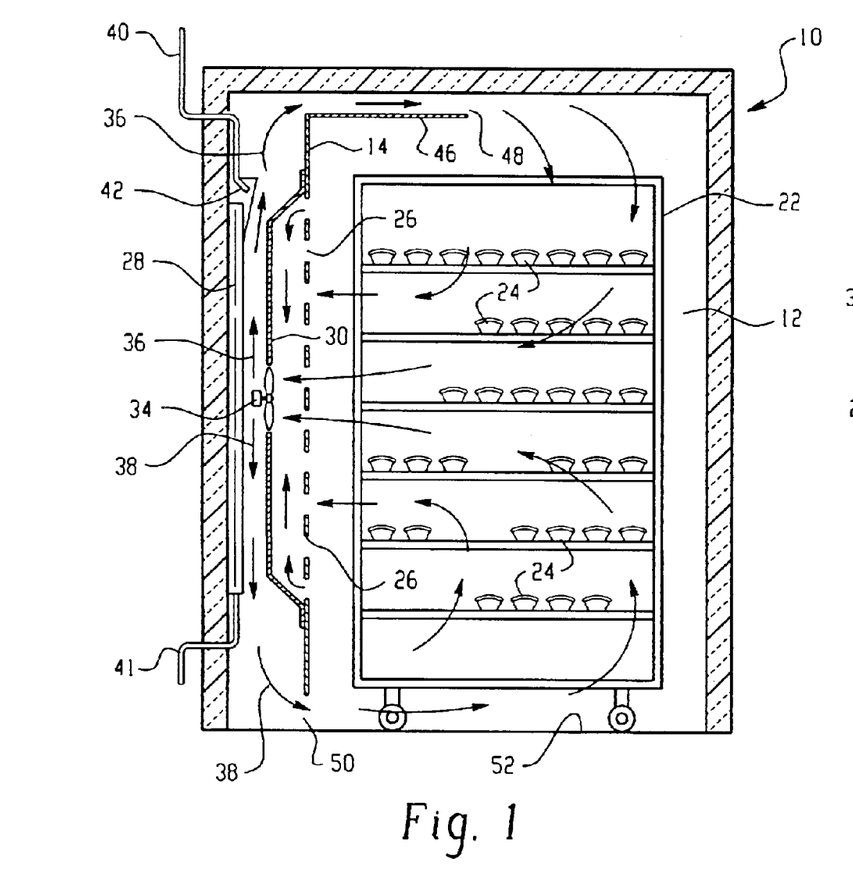
FIG. 1 is a front view of a dough proofer, illustrating various internal structures.
Figure 2:
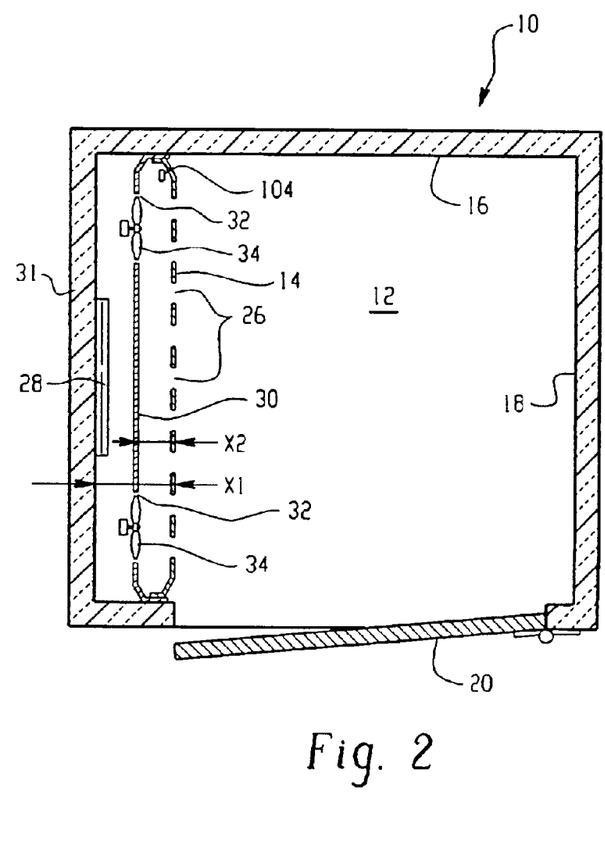
FIG. 2 is a top view of the proofer of FIG. 1.

Referring to FIGS. 1 and 2 a proofer 10 includes a proofing chamber 12 defined by inner walls 14, 16 and 18, along with door 20 that provides access to the chamber 12 for permitting a rack 22 of dough products 24 to be moved into and out of the chamber 12. Wall 14, which may take the form of a stainless steel or aluminum panel, includes a plurality of openings 26 distributed thereon. A heating element 28, which may take the form of a resistive-type heating plate (e.g., a resistive heating element within a plate structure), is located to the backside of panel 14, outside of the chamber 12. An intermediate panel 30 separates the heating element 28 from the panel 14 and its openings 26, the intermediate panel including one or more openings 32 therein. As shown, the heating element 28 is located to the backside of panel 30. One or more blowers 34 are provided, and may take the form of axial fans aligned with openings 32. An upper air flow path 36 leads from the heating element 28 back to the chamber 12 for returning air to an upper part of the chamber 12 and a lower air flow path 38 leads from the heating element 28 back to the chamber 12 for returning air to a lower part of the chamber 12. In the illustrated embodiment, while panel 30 separates heating element 28 from panel 14, the heating element 28 is in flow communication with the panel openings 26 via the openings 32 in panel 30.

In one embodiment, a low profile arrangement is maintained, with a distance X1 between the panel 14 and the inner side of the insulated exterior housing wall 31, is between about 2.5 inches and about 3.5 inches, and with a distance X2 between panel 14 and intermediate panel 30 being between about 1.0 inch and 2.0 inches. It is recognized that variations on these distances are possible.

Operation of the blowers 34 causes air flow through the openings 26, through the intermediate panel openings 32, past the heating element 28 and along both the upper air flow path 36 and the lower air flow path 38 back to the chamber 12. The heating element 28 is controllably energized during a proofing process to add heat to the flow of air and produce a temperature condition within the chamber 12 suitable for dough proofing. A source of water, such as pipe 40 with an end spray nozzle 42 positioned to deliver water onto the heating element 28, is also provided to increase the humidity of the air to a condition suitable for dough proofing. A drain pipe 41 is also provided toward the bottom of the heating element 28 to drain off water that does not evaporate. A suitable temperature condition for dough proofing is a temperature in the range of 65° F. to 115° F. and a suitable humidity condition for dough proofing is a relative humidity of at least 25%, although often times it is desirable to maintain a relative humidity of at least 50%.

Figure 5:
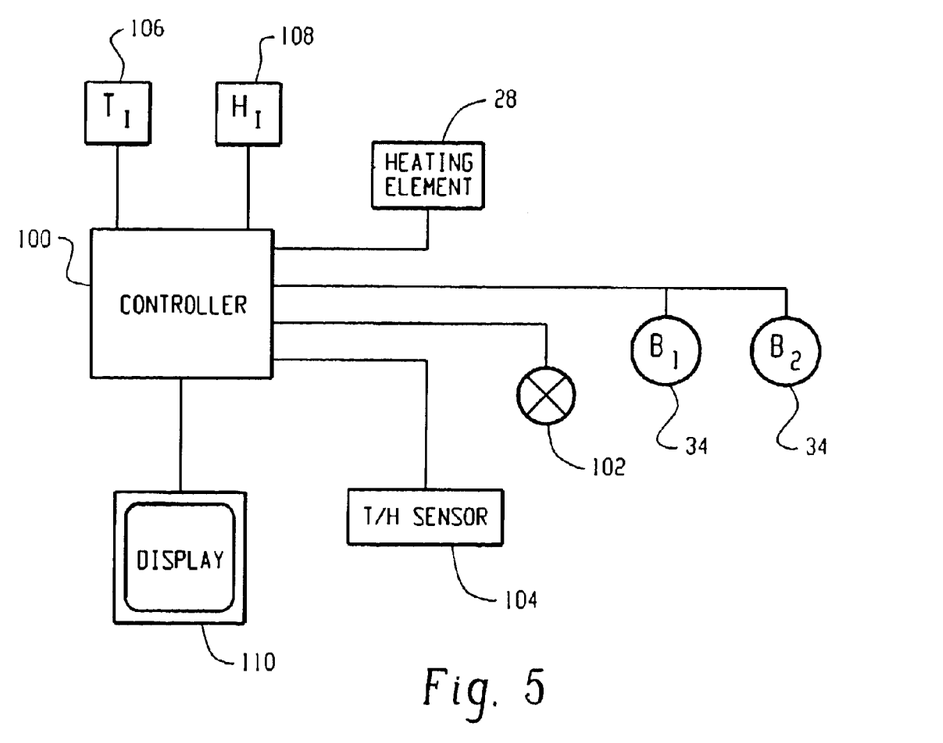
FIG. 5 is a control diagram.

Referring to FIG. 5, a controller 100 may be connected to control energization of the heating element 28 and may also be connected to control a valve 102 associated the water source. The controller 100 may receive inputs from a temperature sensor and a humidity sensor, and may responsively control the heating element 28, water source via valve 102, and blowers 34 to maintain suitable proofing conditions within the chamber 12. In the illustrated embodiment a combined temperature and humidity sensor 104 is used, and is positioned between the panel 14 and panel 30 as best seen in FIG. 2. Referring again to FIG. 5, the controller may receive input from a number of user input devices, such as a temperature input device 106 for inputting a desired temperature for a proofing operation and a humidity input device 108 for inputting a desired humidity for a proofing operation. The controller 100 may also be pre-configured with one or more proofing routines (e.g., stored in memory) that a user can select using an appropriate input device. Such proofing routines may involve the controller varying the temperature and humidity within the proofer at various points during a proofing operation. The controller 100 may also be connected to drive one or more displays 110 for conveying information, such as time, temperature and humidity to operators.

In one embodiment, the controller may selectively operate one or both blowers 34 during a proofing operation. In one example, concurrent operation of both blowers 34 occurs only during times when the heating element 28 is ON. In another example, one or both blowers 34 can be selectively operated during proofing to help control temperature (e.g., by reducing air flow past the heating element), and in such situations the fan control would be implemented based upon detected temperature. In another example, one or both blowers 34 can be selectively operated during proofing to control the amount of air flow across the dough within the proofing chamber. In this latter example the controller 100 may be pre-set to operate one blower during a certain portion or portions of the proofing operation and to operate both blowers at other times during the proofing operation.

Figure 3:
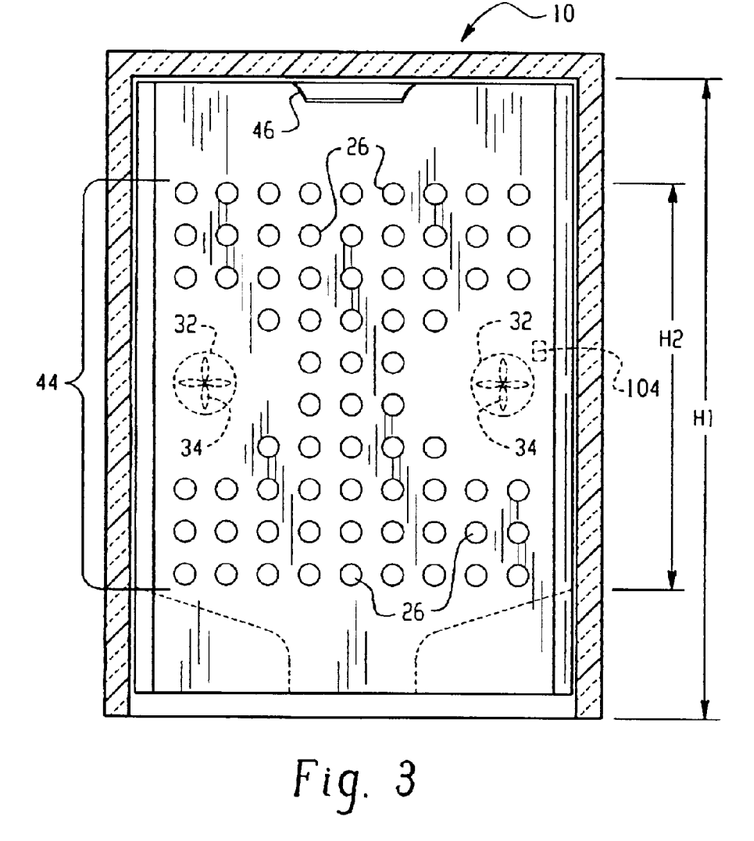
FIG. 3 is a elevation of a side of the proofing chamber.

Referring now to FIG. 3, an elevation view of panel 14 showing the distribution of openings 26 is shown. In order to achieve a more uniform air flow within the chamber 12, the openings 26 are distributed over a vertical mid-section 44 of the height H1 of the chamber 12. In the illustrated embodiment the openings 26 are distributed over a vertical distance H2 that is approximately ⁷⁄₁₀ an overall height H1 of the proofing chamber 12. However, variations are possible. In a preferred embodiment the vertical distance H2 is at least ³⁄₁₀ of the overall height H1. As shown, the openings 26 are also distributed laterally across the panel 14, with the lateral distribution of openings 26 being greater toward the top and bottom of the vertical mid-section 44 than at the central part of the vertical mid-section 44. The reason for this distribution is to maintain all openings 26 a reasonable distance from the openings 32 in the panel so as to provide relatively uniform air flow from the chamber 12 through all openings 26. In particular, operation of the blowers 34 causes air to flow through the panel openings 32 toward the heating element area, creating a reduced pressure condition in the area between the panel 30 and the panel 14, thereby causing air to flow from the chamber 12 through the panel openings 26.

Figure 4:
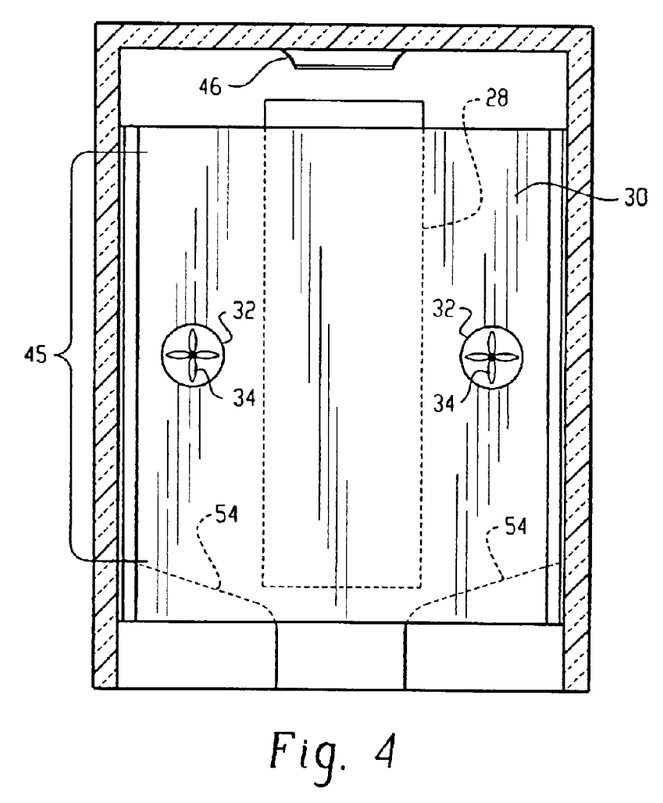
FIG. 4 corresponds to the elevation of FIG. 3 with the chamber panel removed.

In the illustrated embodiment, as best seen in FIG. 4, the openings 32 in panel 30 are also located within a vertical mid-section 45 of the panel 30, but slightly higher than ½ the overall height of the chamber 12. The panel 30 and/or panel 14 may include one or more structural bends therein for increased rigidity.

As shown in the illustrated embodiment of FIG. 1, a suitably uniform air flow within the chamber 12 is achieved through the combination of (i) the distribution of openings 26, (ii) the relatively uniform air flow through openings 26 and (iii) the return of air to the chamber 12 at both the top and bottom thereof. The upper return air flow path 36 may be defined in part by a duct 46 extending into the chamber 12 at the top thereof, with an outlet 48 of the duct 46 spaced from the panel 14. This upper outlet 48 position also aids in a more uniform air flow within the chamber 12. The outlet 50 of the lower air flow path 38 to the chamber 12 is defined by the bottom of the panel 14, which is vertically spaced from the chamber floor 52. Ductwork 54 may be provided toward the bottom of the heating element 28 to divert some of the lower return air flow toward the center of the baking chamber 12.

Figure 6A:
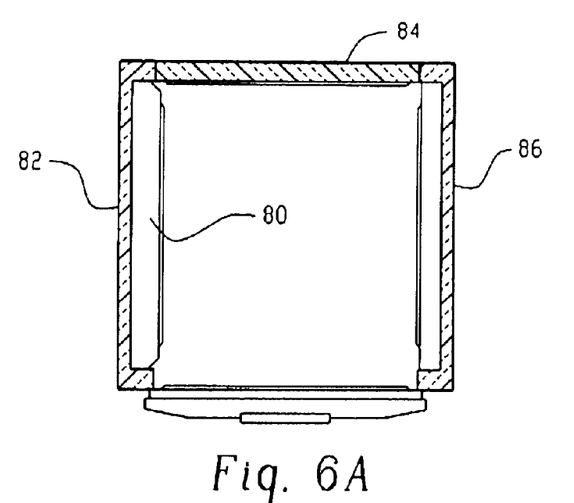
FIGS. 6A–6D illustrate a modular dough proofer embodiment.
Figure 6B:
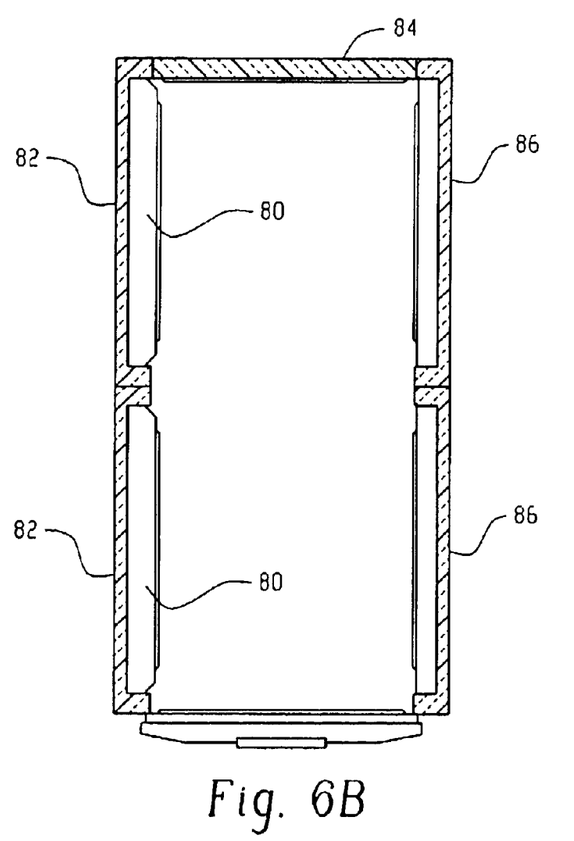
Figure 6C:
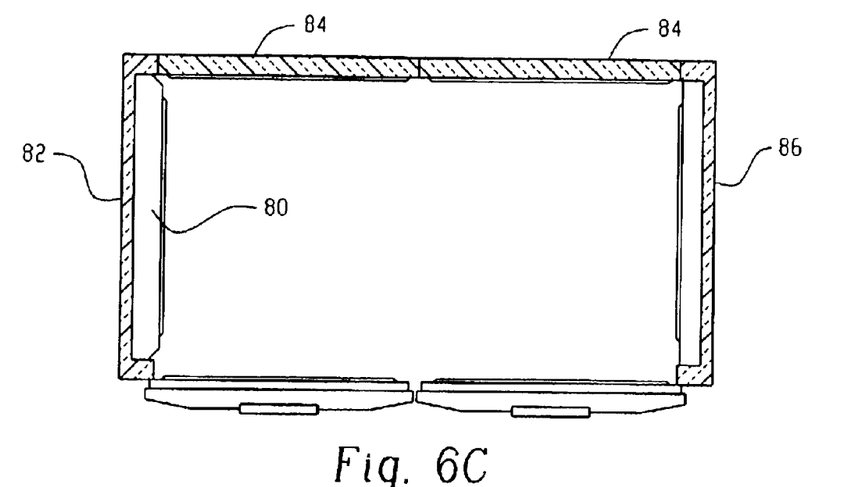
Figure 6D:
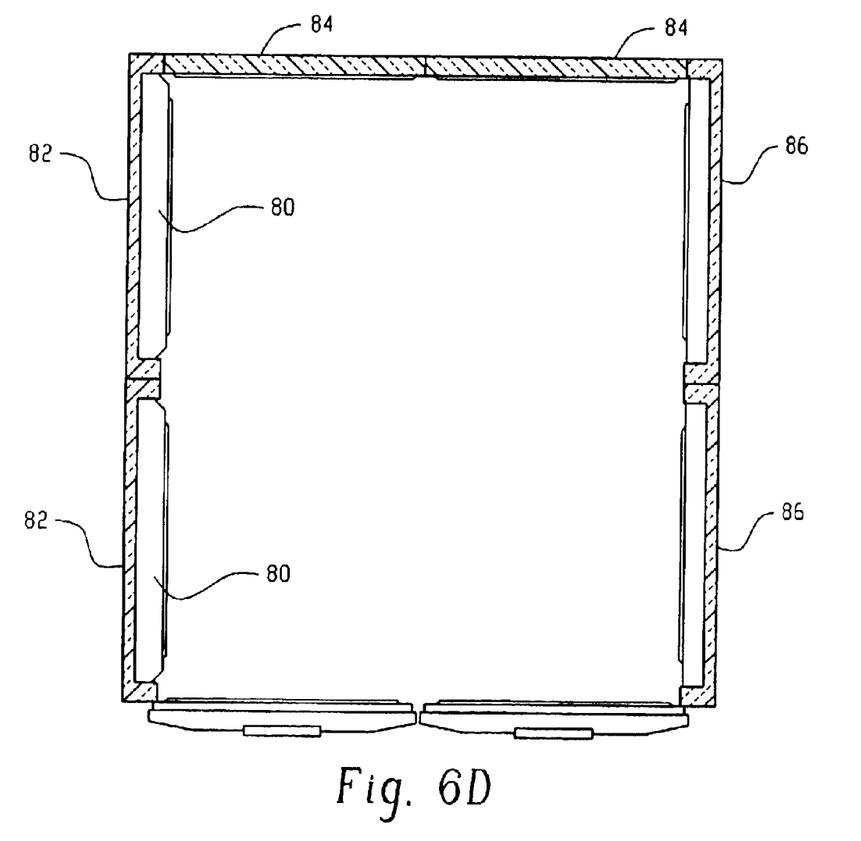

Referring now to FIGS. 6A–6D, a modular system is described to facilitate manufacturing proofers in a variety of configurations. FIG. 6A depicts a single depth, single width configuration (e.g., sized to hold a single rack). FIG. 6B depicts a double depth, single width configuration (e.g., sized to a hold two racks along its depth). FIG. 6C depicts a double depth, single wide configuration (e.g., sized to hold two racks along its width). FIG. 6D depicts a double depth, double wide configuration (e.g., sized to hold four racks in a two wide, two deep arrangement). In this regard, the heat and humidity assembly may be fabricated with the exterior insulated wall 31 to form a modular wall unit 80 that may include each of shallow-U-shaped exterior wall 31, heating element 28 fixed thereto, panels 30 and 14 fixed thereto and blowers 34. The piping for delivering water to the heating element 28 may also be incorporated into the modular wall unit 80. As shown in FIGS. 6A and 6C, a single, modular wall unit 80 is used in configurations that are single depth. As shown in FIGS. 6B and 6D, two modular wall units 80, which may positioned adjacent each other along the depth of the proofing chamber as in the illustrated embodiment, are used in configurations that are double depth. In another embodiment, the modular wall units 80 might be positioned on opposite sides of the chamber in configurations that are double depth. It is recognized that in a configuration that is triple depth, three modular wall units 80 would be used. Notably, the wall structures 82, 84 and 86 may also be modular in construction.

Figure 7:
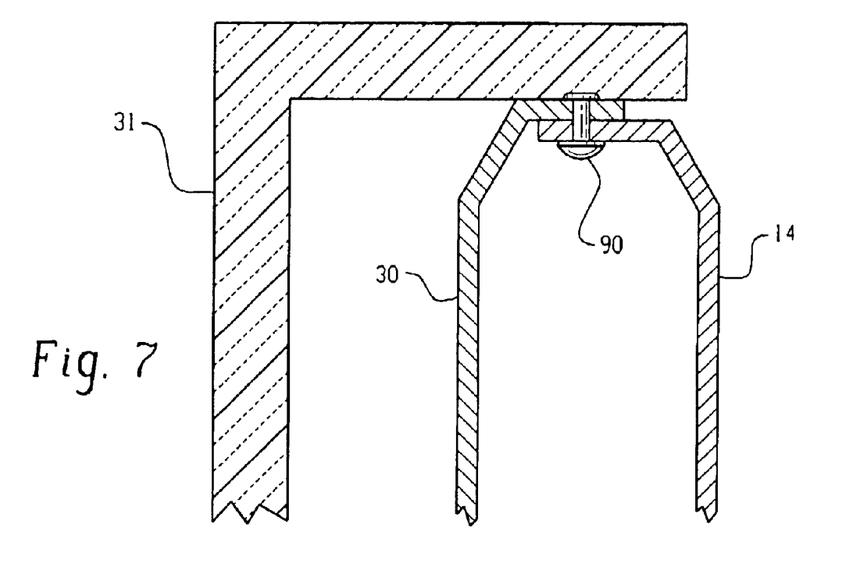
FIG. 7 is partial cross-section illustrating one embodiment of a connection between the panels and the insulated exterior wall of the proofer.

Referring to FIG. 7, the modular wall units 80 may be formed to include pins 90 extending from the inner surface of the protruding parts of shallow, U-shaped exterior wall 31. Panel 30 may include corresponding slots on side-located mount portions thereof to facilitate mounting the panel 30 to wall 31 on the pins 90. Likewise, panel 14 may include side-located slots that enable panel 14 to also be mounted on the pins 14. The panel 14 may also be fastened to air guides of the wall unit 80 using fasteners 92 shown in FIG. 3, the fasteners 92 fixing the position of panel 14 and thereby also fixing the position of panel 30.

The foregoing modular construction facilitates a method of manufacturing dough proofers in either of first and second configurations, wherein in the second configuration a proofing chamber depth is about twice that of the first configuration, and using modular wall units each having an insulated wall part, a panel connected to the wall part, and an integrated heating element. The method involves the steps of: determining whether to manufacture the first configuration or the second configuration; if a determination is made to manufacture the first configuration, incorporating into the manufactured proofer a single one of said one of said modular wall units with its insulated wall part forming an external portion of the proofer and with its panel partially defining the proofing chamber; if a determination is made to manufacture the second configuration, incorporating into the manufactured proofer two of said modular wall units, with each insulated wall part forming a respective external portion of the proofer and with each panel partially defining the proofing chamber.

It is to be clearly understood that the above description is intended by way of illustration and example only and is not intended to be taken by way of limitation. For example, while the illustrated embodiment utilizes a source of water that applies water directly to the heating element, in other embodiments the source of water could take the form of a steam entry port where steam is input directly to the air flow. As another example, while the illustrated embodiment describes a heating element in the nature of an energizable, resistive heating element within a plate, in other embodiments non-electric heating elements could be used, such as a combustion type heat exchanger. Other changes and modifications could be made, including both narrowing and broadening variations and modifications of the appended claims.

What is claimed is:

1. A dough proofing apparatus, comprising:

a chamber for holding dough during proofing operations and having a door for accessing the chamber, at least one chamber panel partially defining the chamber and having a plurality of openings distributed thereon, the openings located along at least a mid-section of a height of the chamber;

a heating element located outside the chamber and in flow communication with the plurality of openings;

a source of water for increasing humidity;

an upper air flow path leading from the heating element back to the chamber for returning air to an upper part of the chamber;

a lower air flow path leading from the heating element back to the chamber for returning air to a lower part of the chamber;

at least one blower for causing air to flow through the chamber panel openings, past the heating element and along both the upper air flow path and the lower air flow path back to the chamber; and at least one intermediate panel located behind the chamber panel and defining an area for receiving air passing through the plurality of openings in the chamber panel, the intermediate panel having at least one opening located at a height within the mid-section of the height of the chamber, the intermediate panel separating the heating element from the chamber panel openings.

2. The apparatus of claim 1 wherein the blower comprises an axial fan aligned with the intermediate panel opening.

3. The apparatus of claim 1 wherein the at least one intermediate panel opening comprises first and second openings, the at least one blower comprises first and second blowers, the first blower associated with the first opening and the second blower associated with the second opening.

4. The apparatus of claim 3 further comprising a controller connected to control the first and second blowers, the controller operable during a proofing operation to effect operation of only the first blower during at least part of the operation and to effect operation of both the first and second blowers during another part of the operation.

5. A dough proofing apparatus, comprising:
   a chamber for holding dough during proofing operations, at least one chamber panel partially defining the chamber and having a plurality of openings distributed thereon;
   at least one intermediate panel located behind the chamber panel and defining an area for receiving air passing through the plurality of openings in the chamber panel, the intermediate panel having at least one opening located therein;
   a blower associated with the intermediate panel opening, wherein operation of the blower causes air to flow through the intermediate panel opening out of the area between the intermediate panel and the chamber panel to create a reduced pressure condition in the area between the intermediate panel and the chamber panel causing air to flow from the chamber through the chamber panel openings;
   a heating element located to have air moved by the blower pass thereby;
   a source of water for increasing humidity; and
   at least one air flow path leading from the heating element back to the chamber for returning air to the chamber.

6. The apparatus of claim 5 wherein the plurality of chamber panel openings are distributed over at least a vertical mid-section of a height of the chamber.

7. The apparatus of claim 6 wherein the intermediate panel opening is located at a height within the vertical mid-section of the height of the chamber.

8. The apparatus of claim 5 wherein the plurality of chamber panel openings are all spaced away from the intermediate panel opening so as to avoid alignment with the intermediate panel opening.

9. The apparatus of claim 5 wherein the at least one air flow path comprises both an upper air flow path for returning air to an upper part of the chamber and a lower air flow path for returning air to a lower part of the chamber.

10. The apparatus of claim 5 wherein the at least one air flow path comprises an upper air flow path for returning air to an upper part of the chamber, the upper air flow path defined in part by a duct area that extends at the top of the chamber and delivers air into the chamber at a location spaced laterally from the chamber panel.

11. The apparatus of claim 5 wherein the at least one intermediate panel opening comprises at least first and second openings each having a corresponding blower associated therewith.

12. The apparatus of claim 11 wherein the first and second blowers comprise axial fans.

13. The apparatus of claim 11 further comprising a controller connected to control the blowers, the controller operable during a proofing operation to effect operation of only a single blower during at least part of the operation and to effect operation of both blowers during another part of the operation.

14. The apparatus of claim 5 further comprising a controller for controlling the heating element to produce a temperature condition and humidity condition with the chamber suitable for proofing dough.

15. The apparatus of claim 14 wherein the controller is connected to a temperature sensor positioned in the area between the chamber panel and the intermediate panel.

16. The apparatus of claim 15 wherein the controller is connected to a humidity sensor positioned in the area between the chamber panel and the intermediate panel.

17. The apparatus of claim 16 wherein the temperature sensor and the humidity sensor are a combined sensor.

18. The apparatus of claim 14 wherein the temperature condition comprises a temperature in the range of 650° F. to 1150° F. and the humidity condition comprises a relative humidity of at least 50%.

19. The apparatus of claim 5 wherein a distance between the chamber panel and an inner side of an exterior wall is between about 2.5 inches and about 3.5 inches.

20. The apparatus of claim 19 wherein the area between the chamber panel and the intermediate panel is between about 1.0 inch and about 2.0 inches wide.

21. A method for proofing dough, comprising:
   providing a dough proofing apparatus having a chamber for holding dough, a chamber panel including a plurality of openings distributed thereon, the openings located along at least a mid-section of a height of the chamber, a heating element located outside the chamber, an upper air flow path from the heating element back to the chamber and a lower air flow path from the heating element back to the chamber;
   placing dough within the chamber;
   operating at least one blower to cause air flow from the proofer chamber, through the chamber panel openings, over the heating element and back to the chamber along both the upper air flow path and the lower air flow path;
   controlling a heat output by the heating element and controlling a source of water to produce a temperature condition and humidity condition within the chamber suitable for proofing dough.

22. The method of claim 21 wherein the temperature condition comprises a temperature in the range of 650° F. to 1150° F.

23. The method of claim 22 wherein the humidity condition comprises a relative humidity of at least 50%.

24. The method of claim 21 wherein an intermediate panel separates the chamber panel from the heating element and the blower is aligned with an opening in the intermediate panel.

25. The method of claim 21 wherein at least first and second blowers are provided and operation of only the first blower occurs during at least part of the thawing operation and operation of both the first and second blowers occurs during another part of the thawing operation.

26. A method for proofing dough, comprising:
   providing a dough proofing apparatus having a chamber for holding dough, a chamber panel including a plurality of openings distributed thereon, an intermediate panel adjacent a backside of the chamber panel to form an area for receiving air passing through the openings from the chamber, an intermediate panel air flow path leading from the area and including at least one associated blower, a heating element located outside the chamber, at least one return air flow path in communication with the intermediate panel air flow path and leading back to the chamber;
   placing dough within the chamber;
   operating the blower to cause air flow along the intermediate panel air flow path and to the return path to create a reduced pressure condition in the area between the intermediate panel and the chamber panel, the reduced pressure condition causing air flow from the proofer chamber, through the chamber panel openings into the area between the intermediate panel and the chamber panel;

controlling a heat output by the heating element and controlling a source of water to produce a temperature condition and humidity condition within the chamber suitable for proofing dough.

27. The method of claim 26 wherein the temperature condition comprises a temperature in the range of 650° F. to 1150° F.

28. The method of claim 27 wherein the humidity condition comprises a relative humidity of at least 50%.

29. A modular wall unit for use in constructing dough proofers of various sizes, the modular wall unit comprising:

an insulated wall;

a first panel mounted to the insulated wall forming a space between the insulated wall and the panel, the first panel including a plurality of openings thereon;

a heating element mounted on a side of the insulated wall within the space;

an intermediate panel mounted between the first panel and the insulated wall and separating the beating element from the first panel, at least one opening located in the intermediate panel;

a blower aligned with the intermediate panel opening.

30. The modular wall unit of clam 29 wherein the insulated wall comprises a U-shaped wall member.

31. The modular wall unit of claim 30 wherein both the first panel and the second panel are connected to protruding side-parts of the U-shaped wall member.

32. A dough proofing apparatus, comprising:

a chamber for holding dough during proofing operations and having a door for accessing the chamber, at least one chamber panel partially defining the chamber and having a plurality of openings distributed thereon, the openings located along at least a mid-section of a height of the chamber;

a heating element comprising a heating plate, the heating element located outside the chamber and in flow communication with the plurality of openings;

a source of water for increasing humidity;

an upper air flow path leading from the heating element back to the chamber for returning air to an upper part of the chamber;

a lower air flow path leading from the heating element back to the chamber for returning air to a lower part of the chamber; and at least one blower for causing air to flow through the chamber panel openings, past the heating element and along both the upper air flow path and the lower air flow path back to the chamber.

33. A dough proofing apparatus, comprising:

a chamber for holding dough during proofing operations and having a door for accessing the chamber, at least one chamber panel partially defining the chamber and having a plurality of openings distributed thereon, the openings located along at least a mid-section of a height of the chamber;

a heating element located outside the chamber and in flow communication with the plurality of openings;

a source of water for increasing humidity;

an upper air flow path leading from the heating element back to the chamber for returning air to an upper part of the chamber;

a lower air flow path leading from the heating element back to the chamber for returning air to a lower part of the chamber; and at least one blower for causing air to flow through the chamber panel openings, past the heating element and along both the upper air flow path and the lower air flow path back to the chamber;

wherein the upper air flow path delivers air into the baking chamber at a location spaced apart laterally from the chamber panel.

34. The apparatus of claim 33 wherein the upper air flow path includes a duct extending into the chamber at the top thereof.

35. A dough proofing apparatus, comprising:

a chamber for holding dough during proofing operations and having a door for accessing the chamber, at least one chamber panel partially defining the chamber and having a plurality of openings distributed thereon, the openings located along at least a mid-section of a height of the chamber;

a heating element located outside the chamber and in flow communication with the plurality of openings;

a source of water for increasing humidity;

an upper air flow path leading from the heating element back to the chamber for returning air to an upper part of the chamber;

a lower air flow path leading from the heating element back to the chamber for returning air to a lower part of the chamber;

at least one blower for causing air to flow through the chamber panel openings, past the heating element and along both the upper air flow path and the lower air flow path back to the chamber; and a controller for controlling the heating element to produce a temperature condition and humidity condition within the chamber suitable for proofing dough;

wherein the temperature condition comprises a temperature in the range of 650° F. to 1150 F. and the humidity condition comprises a relative humidity of at least 25%.

36. The apparatus of claim 35 wherein the humidity condition comprises a relative humidity of at least 50%.

* * * * *

UNITED STATES PATENT AND TRADEMARK OFFICE
CERTIFICATE OF CORRECTION

PATENT NO.    : 6,894,252 B2                                    Page 1 of 1
DATED         : May 17, 2005
INVENTOR(S)   : Hans Paller et al.

It is certified that error appears in the above-identified patent and that said Letters Patent is hereby corrected as shown below:

Column 8,
Lines 12, 13, 40 and 41, change "650°F" to -- 65°F --, and change "1150°F" to -- 115°F --.
Lines 50 and 52, change "thawing" to -- proofing --.

Column 9,
Lines 12 and 13, change "650°F" to -- 65°F --, and change "1150°F" to -- 115°F --.
Line 27, change "beating" to -- heating --.
Line 31, change "clam" to -- claim --.

Column 10,
Line 53, change "650°F" to -- 65°F --, and change "1150°F" to -- 115°F --.

Signed and Sealed this

Sixteenth Day of August, 2005

JON W. DUDAS
*Director of the United States Patent and Trademark Office*